US011278995B2

(12) United States Patent
Hohmann et al.

(10) Patent No.: US 11,278,995 B2
(45) Date of Patent: Mar. 22, 2022

(54) METHOD FOR TIGHTENING SCREWED CONNECTIONS, MULTI-SCREWING DEVICE

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 0 days.

(21) Appl. No.: 17/183,392

(22) Filed: Feb. 24, 2021

(65) Prior Publication Data
US 2021/0268614 A1    Sep. 2, 2021

(30) Foreign Application Priority Data

Feb. 27, 2020    (DE) .................... 10 2020 105 104.2

(51) Int. Cl.
*B23P 19/06* (2006.01)
*B25J 11/00* (2006.01)
(Continued)

(52) U.S. Cl.
CPC ........... *B23P 19/069* (2013.01); *B23P 19/067* (2013.01); *B25B 21/00* (2013.01); *B25J 11/005* (2013.01); *B23P 19/06* (2013.01); *B25J 5/007* (2013.01); *B25J 9/144* (2013.01); *B25J 9/146* (2013.01); *B25J 9/1633* (2013.01); *B25J 19/02* (2013.01); *F03D 13/20* (2016.05); *F05B 2260/301* (2013.01)

(58) Field of Classification Search
CPC ....... B23P 19/06; B23P 19/067; B23P 19/069; B25J 5/007; B25J 9/144; B25J 9/146; B25J 9/1633; B25J 9/1687; B25J 11/005; B25J 19/02; B25B 21/00
See application file for complete search history.

(56) References Cited

U.S. PATENT DOCUMENTS 5,101,694 A * 4/1992 Sevelinge ............... B23P 19/06
81/57.4
2010/0175240 A1   7/2010 Wagner et al.
(Continued)

FOREIGN PATENT DOCUMENTS

EP    3 769 904       1/2021
JP    H01103240       4/1989
(Continued)

*Primary Examiner* — Jermie E Cozart
(74) *Attorney, Agent, or Firm* — Gudrun E. Huckett

(57) ABSTRACT

For tightening screwed connections by a multi-screwing device with first and second screwing tools, each with rotary drive for screwing an exchangeable bushing on and off, a device for longitudinally straining a threaded bolt, and a tool for retightening the nut, the screwing tools are moved at right angles relative to tool axes by an actuating drive. When the bushings of the screwing tools are both screwed onto a threaded bolt, these steps are performed: a) bushing of first screwing tool is unscrewed from threaded bolt and raised; b) first screwing tool is moved relative to the second into a position in which tool axis of first screwing tool is aligned with screw axis of a further threaded bolt; c) first screwing tool is lowered and screwed onto further threaded bolt; d) threaded bolt is longitudinally strained, and e) steps a) to d) are repeated for second tool.

25 Claims, 7 Drawing Sheets

(51) Int. Cl.
  *B25B 21/00* (2006.01)
  *F03D 13/20* (2016.01)
  *B25J 9/14* (2006.01)
  *B25J 9/16* (2006.01)
  *B25J 19/02* (2006.01)
  *B25J 5/00* (2006.01)

(56) References Cited

U.S. PATENT DOCUMENTS

2013/0185932 A1  7/2013  Imi
2014/0350724 A1  11/2014  Jobst et al.

FOREIGN PATENT DOCUMENTS

JP   H01216730   8/1989
JP   H06206128   7/1994

\* cited by examiner

METHOD FOR TIGHTENING SCREWED CONNECTIONS, MULTI-SCREWING DEVICE

BACKGROUND OF THE INVENTION

The invention relates to a method for tightening screwed connections, the screw axes of which are arranged in mutually fixed positions and which are each comprised of a threaded bolt and of a nut screwed onto its thread and supported against a base.

The invention further relates to a multi-screwing device, which is particularly suitable for a method for tightening screwed connections.

A method for tightening screwed connections by use of a screwing device is known from US 2014/0350724. The device is designed to tighten or retighten a multiplicity of screwed connections arranged in a row along a flange. Each screwed connection is comprised of a threaded bolt and a nut screwed onto the thread of the threaded bolt, wherein the nut is supported against the upper side of the flange. The tightening of the screwed connection by straining, as well as the subsequent turning of the nut relative to the flange, is realized by a screwing tool, which is arranged on a self-propelled vehicle. In order to position the screwing tool above the screwed connection to be tightened in each case, the vehicle is equipped with a position sensor. Based on the position signals of the latter, the vehicle, with the screwing tool arranged on it, is driven in a controlled manner until the signals indicate that the screwing tool is in axial alignment with the screw axis of the screwed connection. For this purpose, the position signals of the position sensor are processed in a control unit into signals for driving the vehicle. The control unit is also designed to control the process of straining and retightening the nut.

A method for tightening screwed connections arranged in a row is also known from US 2010/0175240. Tightening of the screwed connections is realized by a plurality of screwing tools connected in parallel at the same time. Each of the screwing tools has a hydraulic connection, which is hydraulically connected to a common hydraulic unit. The tensioning devices are therefore connected in a hydraulic parallel circuit for parallel operation.

A screwing device in which a plurality of screwing tools can be transported together along screwed connections arranged in a row and can be moved into a position above these screwed connections is known from US 2013/0185932. The screwing tools operate hydraulically, by first mechanically longitudinally straining the threaded bolt of the respective screwed connection.

The known methods and devices are suitable for screwed connections arranged consecutively in a row, as is typical, for example, for flange screw-fastenings that connect individual tower portions of a wind power installation to one another. In this case, a ring flange of an upper tower portion is supported on the ring flange of a tower portion of the wind power installation located beneath it. The flanges are screwed together by a multiplicity of screwed connections, which are arranged in a row evenly distributed around the circumference of the flanges.

The known methods and devices are less suitable, or even unsuitable, in cases in which the screwed connections are not arranged evenly in a row, but in different positions in relation to each other.

The object of the invention is to provide a method that can be executed by a multi-screwing device and that is suitable not only for tightening screwed connections arranged consecutively in a row, but also for tightening screwed connections whose screw axes are arranged in other positions relative to one another. Furthermore, a suitable multi-screwing device is to be created.

SUMMARY OF THE INVENTION

This object is achieved by a method for tightening screwed connections, the screw axes of which are arranged in mutually fixed positions and which are each comprised of a threaded bolt and of a nut screwed onto the thread of the threaded bolt and supported against a base, by use of a multi-screwing device comprising a first screwing tool and at least one second screwing tool, the screwing tools each comprising an exchangeable bushing, which is arranged in the screwing tool so as to be rotatable about a tool axis and which is provided with a tension thread that can be screwed to a longitudinal portion of the thread, a rotary drive for screwing the exchangeable bushing onto and off the thread, a device for longitudinally straining the threaded bolt by exertion of tensile force through the exchangeable bushing along the tool axis, a form-fitting tool that can be coupled to the nut for the purpose of retightening the nut, the screwing tools each being movable in the longitudinal direction of their tool axes by a longitudinal drive and, by at least one actuating drive, the screwing tools being movable relative to each other in a direction that is at right angles relative to at least one of the tool axes, both screwing tools being simultaneously supported against the base at one point in time, and the exchangeable bushing of the first screwing tool and the exchangeable bushing of the second screwing tool each being screwed onto the thread of a threaded bolt, and, with the position of the second screwing tool being unchanged, the following steps ensuing:

a) by the rotary drive, unscrewing the exchangeable bushing of the first screwing tool from the threaded bolt and, by the longitudinal drive, raising the screwing tool;

b) by the actuating drive, moving the first screwing tool relative to the second screwing tool into a new position in which the tool axis of the first screwing tool is in alignment with the screw axis of a further threaded bolt;

c) in the new position, lowering the first screwing tool by the longitudinal drive and, by the rotary drive, screwing the exchangeable bushing onto the further threaded bolt;

d) longitudinally straining the further threaded bolt by exertion of tensile force through the exchangeable bushing and, while maintaining the longitudinal straining, retightening the nut:

e) repeating the steps a) to d), this time for the second screwing tool and with the position of the first screwing tool unchanged.

In the case of this method, a multi-screwing device comprising at least two screwing tools is used, the screwing tools each comprising an exchangeable bushing, which is arranged in the screwing tool so as to be rotatable about a tool axis and which is provided with a tension thread that can be screwed to a longitudinal portion of the thread, a rotary drive for screwing the exchangeable bushing onto and off the thread, a device for longitudinally straining the threaded bolt by exertion of tensile force through the exchangeable bushing along the tool axis, a form-fitting tool that can be coupled to the nut for the purpose of retightening the nut.

The screwing tools are each movable in the longitudinal direction of their tool axes by a longitudinal drive, and are thus designed to be movable. And, by at least one actuating drive, the screwing tools are movable relative to each other in a direction that is at right angles relative to at least one of the tool axes.

At one point in time, both screwing tools are simultaneously supported against the base. At this point in time, the exchangeable bushing of the first screwing tool and the exchangeable bushing of the second screwing tool are each screwed onto the thread of a threaded bolt, and the device for longitudinally straining the respective threaded bolt is activated in both screwing tools, i.e., both exchangeable bushings exert tensile force on the respective threaded bolt, preferably by hydraulic pressure.

Then, with the position of the second screwing tool unchanged, which screwing tool is initially still activated. i.e., exerting tensile force upon the threaded bolt, and subsequent to deactivation of the first screwing tool, the following steps are performed:
  a) by the rotary drive, unscrewing the exchangeable bushing of the first screwing tool from the threaded bolt and, by the longitudinal drive, raising the first screwing tool;
  b) by the actuating drive, moving the first screwing tool relative to the second screwing tool into a new position in which the tool axis of the first screwing tool is in alignment with the screw axis of a further threaded bolt;
  c) in the new position, lowering the first screwing tool by the longitudinal drive and, by the rotary drive, screwing the exchangeable bushing onto the further threaded bolt;
  d) longitudinally straining the further threaded bolt by exertion of tensile force through the exchangeable bushing and, while maintaining the longitudinal straining, retightening the nut;
  e) repeating the steps a) to d), this time for the second screwing tool and with the position of the first screwing tool unchanged.

The deactivation of the second screwing tool is effected no earlier than during step d), i.e., after the start of exerting a tensile force on the further threaded bolt. Since, at each point in time, at least one of the screwing tools is activated by applied hydraulic pressure and this screwing tool is therefore supported under strong pressure against the base, a high degree of precision is achieved in the alternating repositioning of the screwing tools.

For achieving the object of the invention, the invention additionally proposes a multi-screwing device for screwed connections, the screw axes of which are arranged in mutually fixed positions and which are each comprised of a threaded bolt and a nut screwed onto the thread of the threaded bolt and are supported against a base, comprising a first screwing tool and at least one second screwing tool, the screwing tools each comprising
  an exchangeable bushing, which is arranged in the screwing tool so as to be rotatable about a tool axis and which is provided with a tension thread that can be screwed to a longitudinal portion of the thread,
  a rotary drive for screwing the exchangeable bushing onto and off the thread,
  a device for longitudinally straining the threaded bolt by exertion of tensile force through the exchangeable bushing along the tool axis,
  a form-fitting tool that can be coupled to the nut for the purpose of retightening the nut,
  characterized in that the screwing tools are each designed to be movable in the longitudinal direction of their tool axes by a longitudinal drive, and in that the screwing tools are movable relative to each other, in a direction at right angles relative to at least one of the tool axes, by at least one actuating drive.

This multi-screwing device is characterized in that the screwing tools are each designed to be movable in the longitudinal direction of their tool axes by a longitudinal drive, and in that the screwing tools are movable relative to each other, in a direction at right angles relative to at least one of the tool axes, by at least one actuating drive.

The claimed method and the claimed device are suitable not only for tightening screwed connections arranged in a row relative to each other, but also for successively tightening such screwed connections whose screw axes are arranged in other positions relative to each other, e.g., the screw axes are arranged in a transversely or obliquely offset manner in relation to each other and/or the distances from one screwed connection to another vary.

An additional advantage is that the method is suitable not only for tightening substantially vertical screw-fastenings, but also for screw-fastenings that are angled significantly relative to the vertical, and even for screwed connections that have, for example, a horizontal screw axis, and for overhead screw-fastenings. If the screwed connections are, for example, flange connections, the orientation of the flange may not only be horizontal, but also tilted or even vertical.

Overall, therefore, compared with the prior art, a more flexible method for tightening screwed connections is created, with a wide range of applications. The specially designed multi-screwing device is also characterized by high flexibility in different application situations.

It is important that the at least two screwing tools of the device can be moved relative to each other, in a direction transverse to their tool axes, by the provided at least one actuating drive. When the actuating drive is actuated, one of the screwing tools retains its position and its rotational angle, whereas the other screwing tool executes a movement at a right angle, or transversely, relative to its own tool axis. The result is a relative movement of the screwing tools.

It is also important that, at each point in time in the screw fastening process, at least one of the screwing tools is firmly connected to the respective threaded bolt. A fixed position at a particular location is thus ensured at all times. Because of the fixed position, the other, or another, screwing tool can be moved by actuation of the actuating drive to a new position above a further, not yet tightened, threaded bolt; in the new position, the tool axis of this other screwing tool is then in alignment with the further threaded bolt. The movement into this new position is effected with a high degree of precision since during the repositioning the first screwing tool retains its rigid engagement on its threaded bolt, its support on the base, and thus, as a result, its fixed position and its rotational angle.

Overall, therefore, the method is characterized by a repeated transfer into a respectively new screw-fastening position, and is therefore a "self-advancing" method, in which a rigid connection is ensured at a fixed position at all times and this connection is then abandoned, or released, at the earliest when a rigid connection is ensured at another position by screw fastening on the respective further threaded bolt.

The longitudinal straining of the threaded bolt by exerting a tensile force through the exchangeable bushing along the tool axis may be effected sequentially, partially overlapping in time or in parallel, i.e., simultaneously. In the first case, the pretensioning of two threaded bolts is realized in succession, and in the second case the pretensioning is effected at the same time. It is also possible that, for example, two screwing tools are working while a third screwing tool is being repositioned, i.e., above another screw axis.

Sensors may be used to detect the exact position of the next screw-fastening position. Their sensor systems may be designed either to detect the bolt itself that is to be strained in each case, or to detect an adjacent bolt or two adjacent bolts. The detection of the screwed connection may also be effected beneath the respective flange, for example, in case a bolt head of the screwed connection is located there.

One design of the method and of the device therefore proposes a robot control system for moving the respective screwing tool into the new position, the robot control system being sensor-controlled by a sensor designed to locate the position of the threaded bolts.

Electrical, hydraulic or pneumatic actuation is proposed for the actuator that moves transversely relative to the screw axis. Electric, hydraulic or pneumatic actuation is also proposed for the longitudinal drives operating in the longitudinal direction of the screw.

The distance between the tool axes is altered by the single or multiple actuating drive. The distance between the tool axes may be altered in various ways. For example, the alteration of the distance may be effected in a linear, i.e., rectilinear, movement or in a rectilinear movement process. This is advantageous when the screwed connections are substantially arranged in a row.

In another variant, the alteration of the distance of the tool axes is effected in a non-linear movement, and in particular by an arcuate movement or by the combination of two or more arcuate movements. Each arcuate movement, in its simplest form, is a movement along a circular path.

Preferably, the screwing tools are arranged on a common carrier. In this case, the arcuate movements are effected by swivelling the screwing tools relative to the carrier. It is also possible for the screwing tools to be swivelled simultaneously in mutually opposite swivel directions. This may be effected simultaneously or non-simultaneously.

The screwing tools may each be attached to the free end of an arm that can be swivelled about an axle located on the carrier. The longitudinal drives are independent of each other, to move the respective arm parallel to the tool axis.

It is additionally proposed that the exchangeable bushing be screwed on and off by a rotary drive. Each screwing tool is preferably assigned its own rotary drive, which thus operates independently of the rotary drive of the other tool or tools.

Also proposed is an anti-rotation device. This is designed to prevent the threaded bolt from turning concomitantly when and while the exchangeable bushing is being screwed onto the thread of the threaded bolt. Concomitant turning could result in a thread engagement between the exchangeable bushing and the bolt being too short, which could be a great risk for the subsequent bolt tensioning process.

The anti-rotation device is characterized by a holding tool that is designed to be movable back and forth between a neutral position and a counter-holding position. For at least the duration of the retightening/screwing-down of the nut, a counter-holding surface realized on the holding tool is brought into a rotation-locking bearing contact with the threaded bolt, it being understood that the location of this bearing contact is different from the longitudinal portion of the thread that is screwed to the exchangeable bushing.

Also proposed is a process control system for moving the respective screwing tool into its new, or further, position in a controlled manner. Preferably, the process control system also coordinates and controls the other functions of the screwing tools, and preferably also a controlled forward and backward movement of the additional holding tools.

Preferably, the multi-screwing device is comprised of two modules, namely a tool module, in which the screwing tools, including the device for longitudinally straining the threaded bolt and for retightening the nut, the rotary drives, the longitudinal drives, and the actuating drives are grouped together, and further comprised of a spatially separate supply module. At least the power supply for operating the device for longitudinally straining the threaded bolts is grouped in the supply module. A constituent part of the power supply is a supply line, preferably of a flexible design, which leads from the supply module to the tool module.

Preferably also a constituent part of the supply module is the electrical power supply for, inter alia, the rotary drives, the longitudinal drives and the actuating drives. As a constituent part of this power supply, a second, preferably flexible supply line leads from the supply module to the tool module.

For a largely coordinated movement of tool module and supply module, it is proposed, in one design of the method and the device, that the supply module be designed to be movable parallel to the base, preferably via rollers or wheel elements that are rotatably mounted on the supply module, and that the supply module be mechanically connected to the tool module via a flexible or articulated push or pull linkage.

In another design of the method and device, the supply module is arranged in a fixed manner at a central position, with the tool module moving around this central position from one screw-fastening to another. Also, in this alternative design, a supply line, preferably of a flexible design, leads from the supply module to the tool module.

In order to secure the threaded bolt against unwanted concomitant turning while the exchangeable bushing is being screwed on, the multi-screwing device is equipped with an anti-rotation device. The latter is comprised of a holding tool provided with a counter-holding surface that can be placed against the threaded bolt at a location other than the longitudinal portion of the thread that is screwed to the exchangeable bushing. The counter-holding tool is movable back and forth between a neutral position and a counter-holding position in which the counter-holding surface comes into rotation-locking bearing contact with the threaded bolt. The forward movement until engagement with the threaded bolt may be effected either by a motor drive or by the pressure of a spring mechanism.

Each screwing tool is provided with its own holding tool and its own drive for this holding tool. Preferably, the drives of the holding tools are coupled to the movement of the respective screwing tools parallel to their tool axes.

BRIEF DESCRIPTION OF THE DRAWINGS

Exemplary embodiments are explained in greater detail in the following, with reference to the drawings. The drawings show in:

FIG. 10a a variant of an anti-rotation device that can be applied to a threaded bolt and prevent it from turning concomitantly, the detail "A" identified in the upper illustration being shown partially in section in the lower illustration of FIG. 10a.

DESCRIPTION OF PREFERRED EMBODIMENTS

Figure 1:
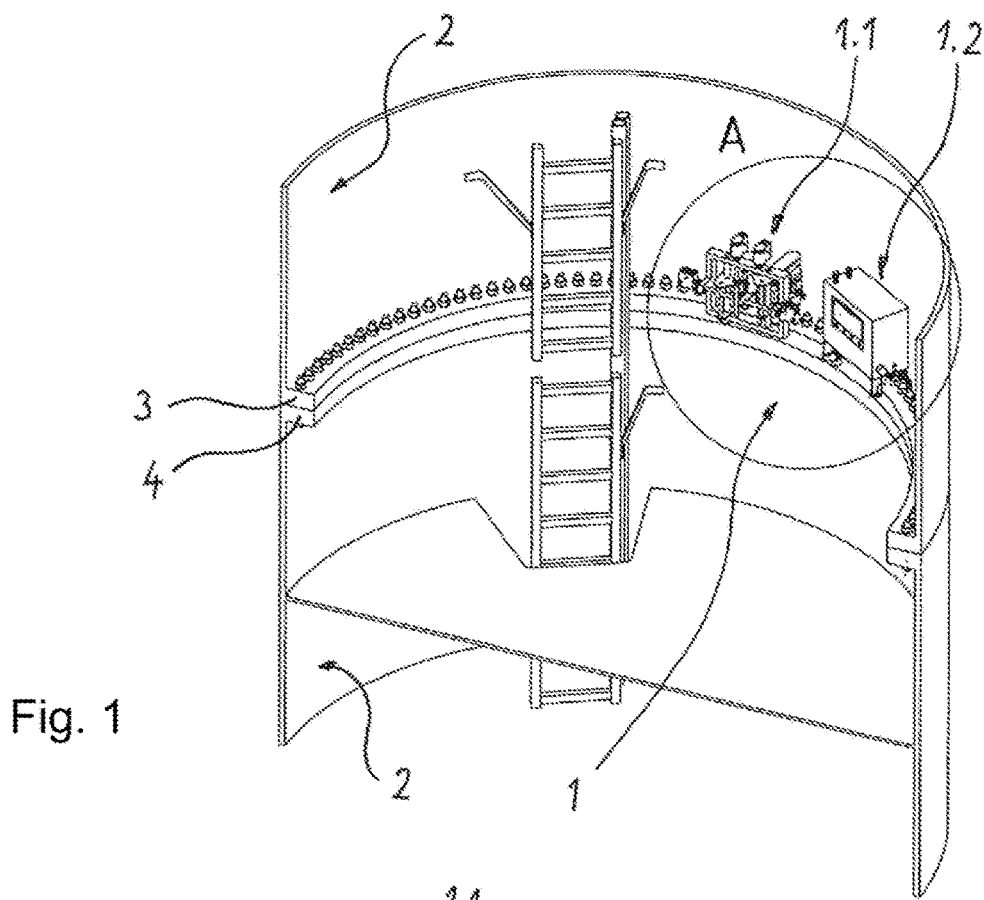
FIG. 1 an interior perspective view of two tower segments of a wind power installation, the connection region of the tower segments formed by screw-connected ring flanges being illustrated only as a half shell, as well as a multi-screwing device, arranged on the ring flanges, for tightening, or retightening, the screw-fastenings.
Figure 8:
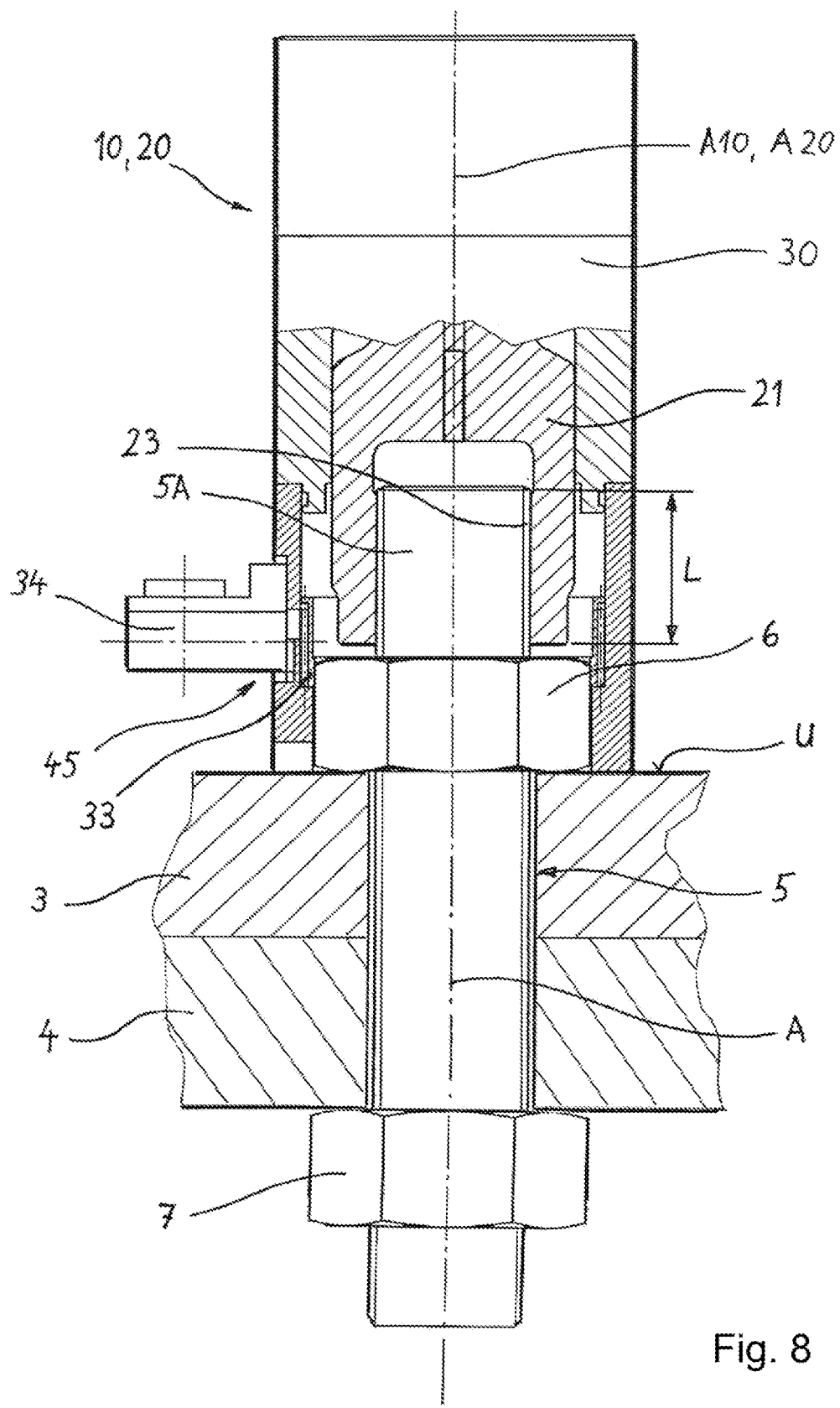
FIG. 8 a partial view through one of the screwing tools of the multi-screwing device in a situation in which the screwing tool has been screwed onto the threaded bolt of a screwed connection, and the longitudinal straining of the threaded bolt can commence.

FIG. 1 shows, in this case for use in the tower of a wind power installation, a multi-screwing device 1, also referred to in the following as a screwing robot, which is comprised of a tool module 1.1 and a separate supply module 1.2. In this case, it is used specifically in the connection region of two tower portions 2 of the wind power installation in order to tighten or retighten screw-fastenings present there. A flange 3 of the respectively upper tower portion 2 is supported on a flange 4 of the tower portion of the wind power installation located beneath it. The flanges 3, 4 are screwed together by screwed connections, which are arranged here in a row, evenly distributed over the circumference of the flanges 3, 4, FIG. 8 shows one of the screwed connections including the two flanges 3, 4. The screwed connection is located on the screw axis A and here is comprised of a threaded bolt 5, a first nut 6 that is screwed onto it, and a second nut 7 that is screwed onto it. The nut 6 bears from above against the flange 3, this bearing contact surface also being referred to in the following as a base U. The other nut 7 bears from below against the other flange 4.

Instead of the second nut 7, the threaded bolt may be provided with an enlarged bolt head that bears against the flange 4 from below, i.e., the threaded bolt 5 may be realized as a cap screw.

FIG. 8 additionally shows a screwing tool 10, 20 in the form of a screw tensioning cylinder. The screw tensioning cylinder can perform two functions: It can strain the threaded bolt 5 in the longitudinal direction and, during straining, it can retighten the nut 6 that in the process has come free from the base U. This retightening action is also referred to as double turning. This retightening action is also referred to as screwing down.

The longitudinal straining of the threaded bolt 5 is effected in an exclusively axial movement along the screw axis A of the screwed connection. For this purpose, an exchangeable bushing 21, which is movable on a tool axis A10, A20 that coincides with the screw axis A, is located in a cylindrical housing 30 of the screw tensioning cylinder 10, 20. The exchangeable bushing 21 is provided at its end with a tension thread 23, realized as an internal thread, for screwing to the thread 5A of the threaded bolt.

The exchangeable bushing 21 may be permanently arranged in the cylindrical housing 30. Alternatively, it may be arranged in an exchangeable manner, so that it can be exchanged for a correspondingly differently dimensioned exchangeable bushing for screw-fastenings that have other thread sizes.

Before commencement of the tensioning process, the tension thread 23 of the exchangeable bushing is screwed onto the thread end portion of the thread 5A that protrudes beyond the nut 6 by a rotary drive that rotates the exchangeable bushing 21 about its tool axis A10, A20. The screw-fastening results in the tension thread 23 being screwed to the thread 5A on a longitudinal portion L.

By hydraulic force, the threaded bolt 5 is strained longitudinally by exclusively axial tensile force applied to the longitudinal portion L of the thread 5A. The tightening force applied and/or the tightening pressure applied by hydraulics in this case may be stored, for example, in a documentation module of a process control unit, and thus documented. While the defined pretensioning force is applied to the threaded bolt 5 with the hydraulically activated tensioning device, the nut 6 is retightened. The torque, or tightening moment, actually applied in this case and the angle of rotation in the retightening action of the nut 6 are likewise stored in the documentation module.

The exchangeable bushing 21, arranged centrally in the cylindrical housing 30, is screwed on by the preferably electrically driven rotary drive. The exchangeable bushing 21 is then subjected to tensile force, which causes the threaded bolt 5 to elongate, or strain. For the duration of the straining action, the underside of the nut 6 comes free from the base U, such that the nut 6 can be rotated with relatively little rotational resistance, and can be retightened, or screwed down, until it is again in contact with the base U without a gap. This is effected, for example, with a specified tightening moment, which is also documented.

The aforementioned rotary drive or a further rotary drive is designed to drive a rotary sleeve 33, which is arranged around the nut 6 and drives it concomitantly in a form-fitting manner. The drive for the rotary sleeve 33 also includes a transmission 34, which acts on the rotary sleeve 33 through an opening in the cylindrical housing, causing it, and thus the nut 6, to rotate.

The hydraulic tensioning mechanism is enclosed by the pressure-resistant cylindrical housing 30. Its rigid continuation in the direction of the base U forms a downwardly open support tube that surrounds the nut 6. The support tube may be part of the cylindrical housing 30 or, alternatively, a component part that is independent of the cylindrical housing 30, e.g., attached to it in a rotationally fixed manner. Towards the base U, the support tube is provided with a support surface in the form of a ring surrounding the nut 6 in order to thus enable high support forces to be dissipated onto the base U, which forms the counter-bearing during the application of hydraulic pressure.

Figure 4:
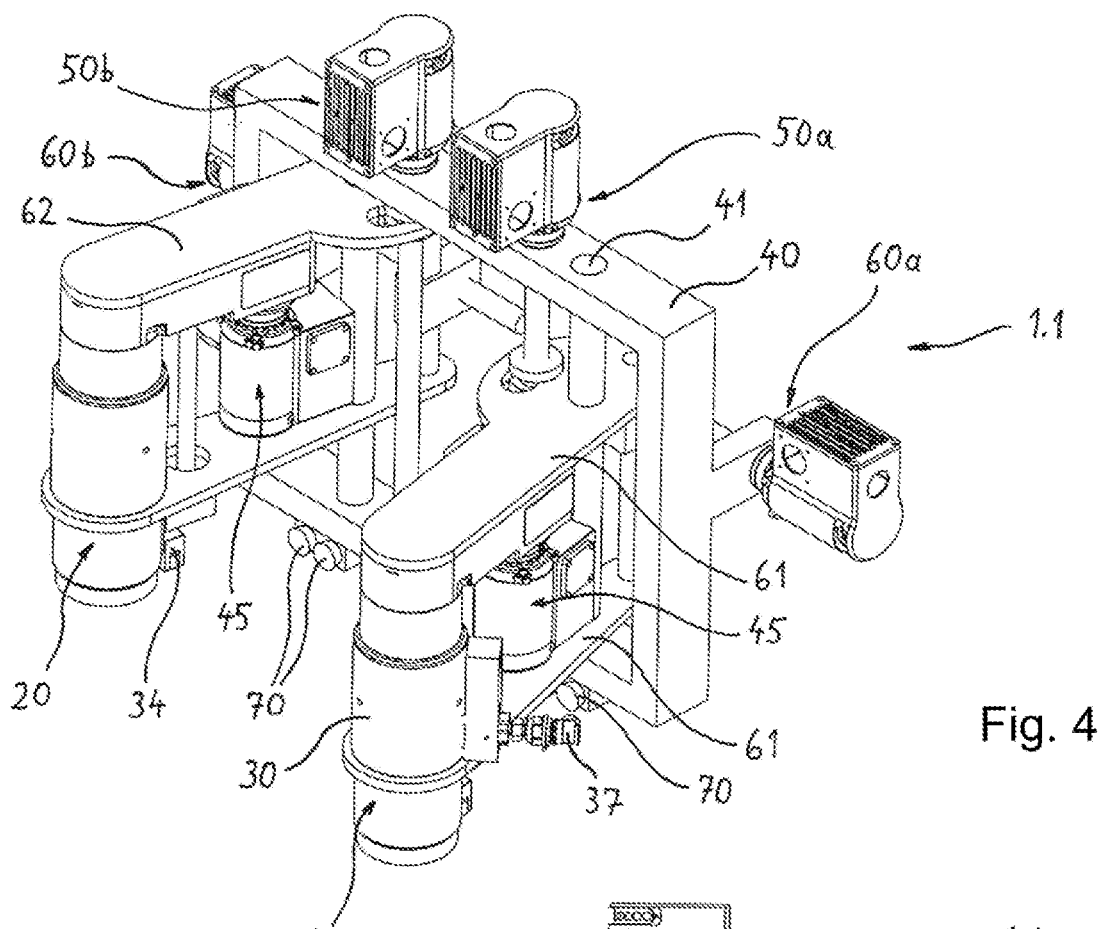
FIG. 4 the tool module of the multi-screwing device in a perspective viewing direction opposite to that of FIGS. 1, 2, and 3.
Figure 5:
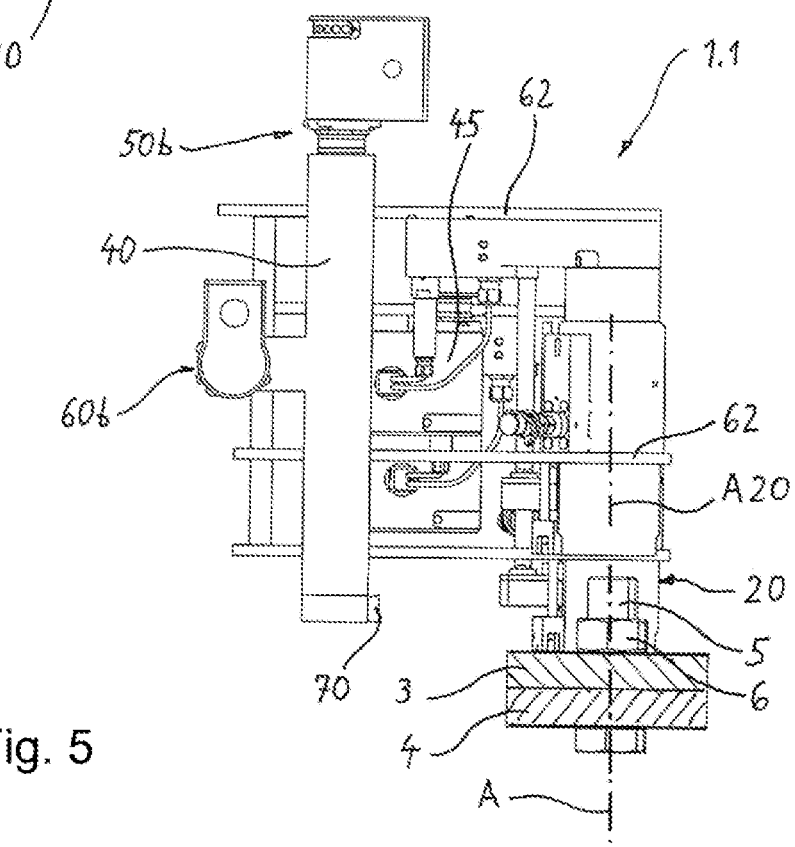
FIG. 5 a side view of the tool module.
Figure 6:
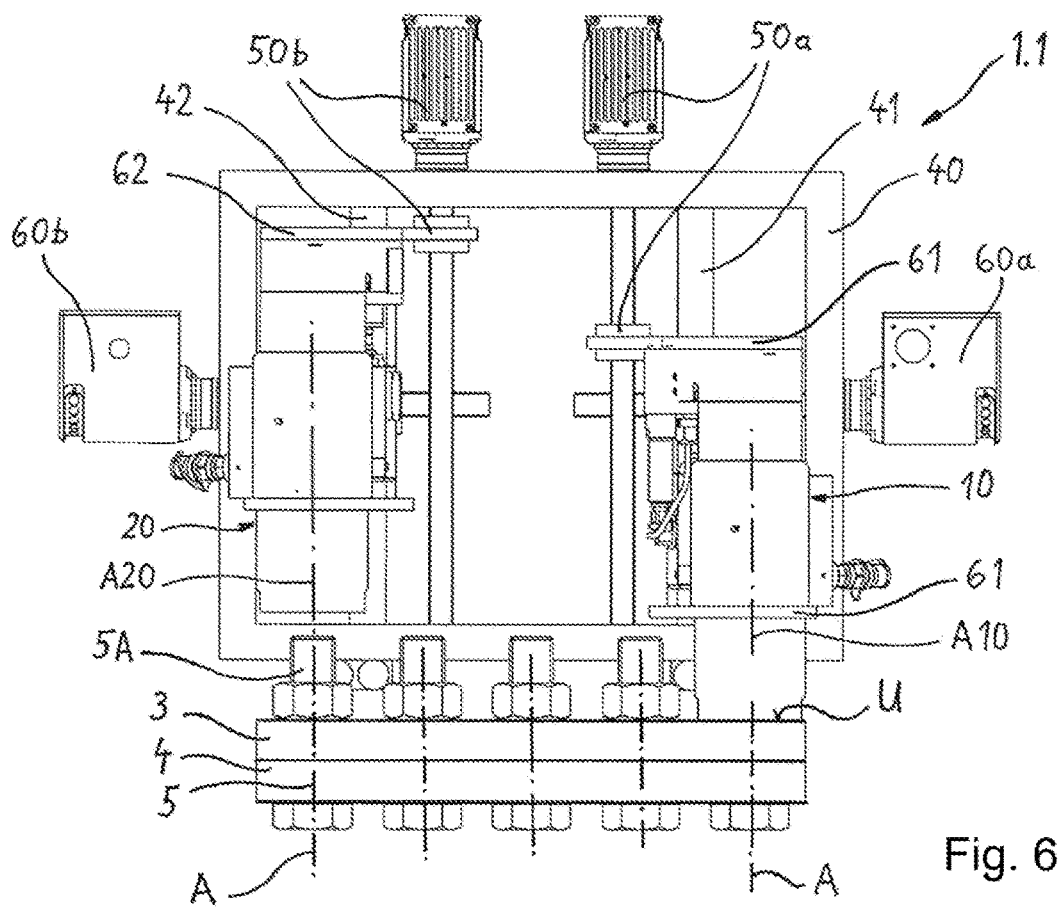
FIG. 6 a rear view of the tool module.

On the side of the cylindrical housing 30 there is a hydraulic connection 37 (FIG. 4) via which a hydraulic working chamber of a hydraulic cylinder realized inside the cylindrical housing 30 can be connected to a hydraulic pump in the supply module 1.2.

A piston is arranged in the hydraulic cylinder of the screwing tool 10, 20 so as to be movable in the longitudinal direction. By feeding hydraulic pressure into the hydraulic cylinder, the piston lifts against the force of a spring acting on the piston. The spring strives to hold the piston in its basic position in which the hydraulic working space is at its minimum.

The piston is designed to axially drive the exchangeable bushing 21. For this purpose, it may be provided with a step on which the exchangeable bushing 21 is supported. When the hydraulic pump feeds pressure fluid into the working chamber, the piston lifts and drives the exchangeable bushing 21 along the tool axis A10, A20. In the process, the cylindrical housing 30 is supported under high pressure against the base U, which forms the counter-bearing. The described longitudinal straining of the threaded bolt 5 occurs.

The amount of pressure provided by the hydraulic pump and the pressure period is set automatically by a process control unit, provided on the screwdriving robot, which coordinates and controls its main functions.

FIGS. 4-7 show an example of the structural design of the tool module 1.1 of the multi-screwing device 1, and the screw fastening method that can be effected by it, including the process-controlled, automatic transfer to a new, or further, screw-fastening position.

In the case of this exemplary embodiment, the tool module 1.1 is equipped with a total of two of the screwing tools already explained with reference to FIG. 8, designed as hydraulic screw tensioning cylinders 10, 20. However, the module may also be equipped with one or more such screwing tools for the purpose of executing the screw fastening method.

The cylindrical housing 30 of the first screwing tool 10 is rigidly attached to the free end of a first arm 61 which, to enable it to swivel, is mounted on an axle 41, which is arranged stationarily on a carrier 40. Likewise, the cylindrical housing 30 of the second screwing tool 20 is rigidly attached to the free end of a second arm 62 which, to enable it to swivel, is mounted on a second axle 42, which is arranged stationarily on the carrier 40. As a result, each screwing tool 10, 20 can be swivelled on an arc, which is a circular arc, about the respective axle 41, 42.

In the case of the exemplary embodiment, the carrier 40 is a frame through which both arms 61 and 62 extend. This provides the possibility to realize each of the arms 61, 62 as two-story double arms, to the free ends of which the respective cylindrical housings 30 are attached, in order to increase the strength of the overall construction.

Each of the two arms 61, 62, in particular in the preferred design as a two-story double arm, offers space for accommodating an electric motor that serves as a rotary drive 45. There is one such rotary drive 45 arranged on each arm 61, 62.

In the case of the exemplary embodiment, the rotary drive 45 performs two functions. The first function is that of rotating the exchangeable bushing 21, arranged in the screwing tool 10 or 20, about the tool axis A10 or A20, respectively, in order to either screw the exchangeable bushing onto, or unscrew it from, a threaded bolt 5. The second function is that of rotating the rotary sleeve 33 (FIG. 8) as the form-fitting tool that can be coupled to the nut 6 and that tightens, or screws down, the nut 6.

To enable the rotary drive 45 to perform both functions in succession, in the case of the device explained here there is a changeover transmission connected downstream of the electric motor of the rotary drive 45. In its first position, the rotary drive 45 drives only the exchangeable bushing 21; in the other position, it drives only the rotary sleeve 33. This changeover is also controlled by the robot control system.

Alternatively, the device may be equipped with a first drive for the exchangeable bushing 21 and with a second separate drive for the rotary sleeve 33.

In order to lower the screwing tool 10, 20 onto the screwed connection, or raise it again, independently of the rotation of the respective exchangeable bushing 21, each screwing tool 10, 20 is provided with its own longitudinal drive 50a and 50b. The longitudinal drive 50a, 50b is designed to raise and lower the respective arm 61, 62, and thus also the screwing tool relative to the carrier 40.

The two longitudinal drives 50a, 50b operate independently of each other such that each arm 61, 62, including the cylindrical housing 30 attached to it, can be raised and lowered individually, i.e., independently of the other arm. The actuation of the longitudinal drives 50a, 50b is also effected in dependence on control signals of the robot control system.

The arms 61, 62 are moved relative to the carrier 40 by actuating drives 60a, 60b. As a result of their actuation, the respective screwing tool 10, 20 performs a movement at a right angle, and thus transversely, relative to its own tool axis A10, A20. This results in a relative movement of the screwing tools, which changes the distance between the tool axes A10, A20.

As a result of actuation of the actuating drive 60a, the first arm 61, and thus the first screwing tool 10, is swivelled about the axle 41. As a result of actuation of the further actuating drive 60b, the second arm 62, and thus the second screwing tool 20, is swivelled about the axle 42.

Figure 7:
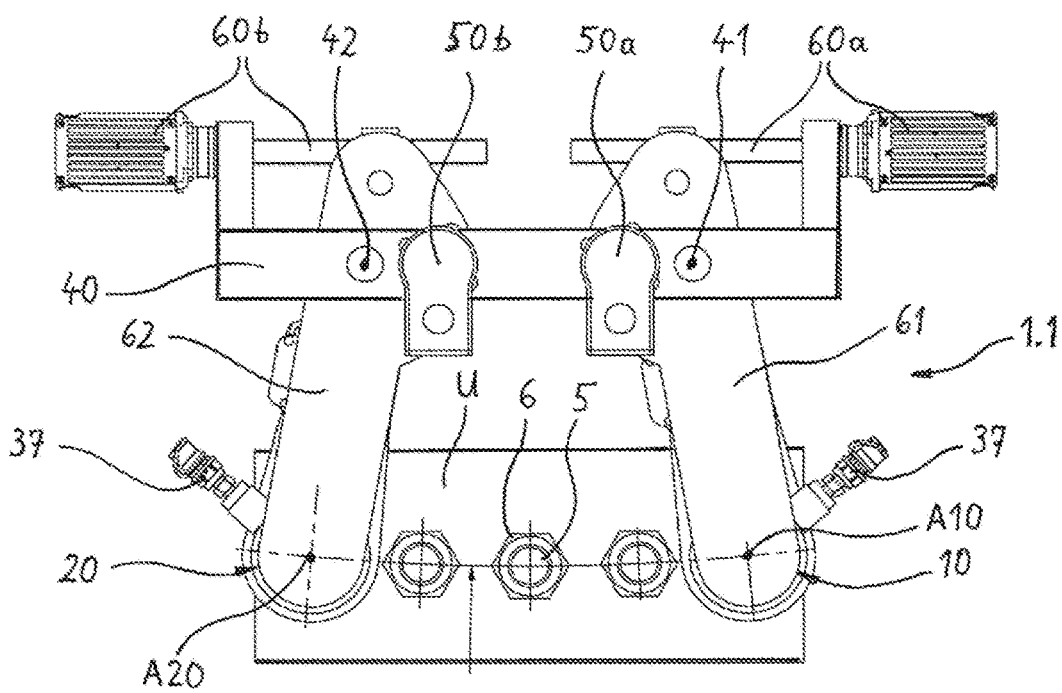
FIG. 7 a top view of the tool module.

For this purpose, as shown by FIG. 7, the actuating drives 60a, 60b have screw spindles that engage the arms 61, 62.

The actuating drives 60a, 60b, and also the longitudinal drives 50a, 50b, are each moved by electric motors in dependence on the process control signals. In principle, it is also possible for the drives to be of a hydraulic or pneumatic design.

Moreover, it is possible, instead of providing two actuating drives 60a, 60b, to provide only one actuating drive. By a suitable transmission, for example, it may drive both arms 61, 62 at the same time and swivel them relative to each other about the axles 41, 42.

By the device described here, a successive transfer from one screwed connection to another screwed connection can be effected without the need, as in the prior art, for a linear drive or a drive that rolls along a predefined circular path. In the case of the method described here, a rigid connection to at least one screwed connection is ensured at all times. This connection is only released after a rigid connection to another screwed connection has been established.

Overall, therefore, the method is characterized by a repeated transfer to a new screw-fastening position, and is therefore a "self-advancing" method, without the movement from one position to another being a travelling or rolling movement from one screw-fastening to another.

At any point in time during the screw fastening process, at least one screwing tool 10, 20 is screwed to its respective threaded bolt 5, and at the same time is supported on the base U. In this screwing tool, the device for longitudinally straining the respective threaded bolt is activated. i.e., the exchangeable bushing exerts tensile force. Thus, at least at this one position, there is a secure, rigid connection, i.e., a fixed position is ensured. At the same time, the other screwing tool, i.e., the hydraulically non-activated screwing tool, can be moved to a new position above another, not yet tightened threaded bolt 5 by the actuating drive or actuating drives 60*a*, 60*b*. The transfer into a new position can be effected with high precision, since during the transfer at least one screwing tool 10, 20 maintains its rigid engagement on the threaded bolt 5 and at the same time is supported on the base U.

The method of moving, or transferring, into a new screw-fastening position is described below on the basis of a practical example and in individual steps. The starting point is a situation in which both screwing tools 10, 20 are hydraulically activated, i.e., each is screw-connected to a threaded bolt 5 of the screwed connections, with the cylindrical housings 30 of both screwing tools 10, 20 being supported on the base U due to the hydraulic forces. Starting from this situation, the following method steps are executed:

a) Hydraulic deactivation of the first screwing tool 10 and, by actuation of the rotary drive 45, unscrewing the exchangeable bushing of the first screwing tool 10 from the respective threaded bolt 5, then, by actuation of the first longitudinal drive 50*a*, raising and releasing the first screwing tool 10 from the screwed connection.

b) By actuation of the actuating drive 60*a*, or alternatively both actuating drives 60*a*, 60*b*, moving exclusively the first screwing tool 10 at a right angle, and thus transversely, relative to its own tool axis A10, into a new position in which the tool axis A10 is in alignment with the screw axis A of a further threaded bolt 5. During this step, the distance between tool axis A10 and tool axis A20 of the fixed-position screwing tool 20 changes.

c) In the new position thus assumed, lowering of the first screwing tool 10 by the longitudinal drive 50*a*, then screwing the exchangeable bushing 21 onto the further threaded bolt 5 by the rotary drive 45.

d) By feeding hydraulic pressure into the first screwing tool 10, longitudinally straining the further threaded bolt 5 by exertion of tensile force through the exchangeable bushing 21 and, while maintaining the longitudinal strain, tightening the nut 6 concerned by the rotary sleeve 33 and driven by the rotary drive of the rotary sleeve 33.

e) Then repeating steps a) to d), but this time by transferring the other, hitherto positionally fixed screwing tool 20, and with the position of the first screwing tool 10 unchanged.

The crucial advantage of this method, which works by "self-advancing" transfer, is that a rigid connection of the tool module 1.1 to a temporary fixed point is ensured at all times. This rigid connection is released only when a new, equally rigid connection has been established. Since at all times the tool module 1.1 is clamped to at least one screwed connection and at the same time is supported on the base U, the method is not only suitable for vertical multiple screwed connections. Rather, the method is also suitable for screwed connections angled in relation to the vertical, and even for multiple screwed connections comprising horizontal screw axes. Even multiple overhead screwed connections can be effected safely and fully automatically by the tool module 1.1.

The robot control system or process control system controls and monitors all the operations involved in transferring the respective screwing tool 10, 20 into the new position, the control system being designed to monitor and control the functioning of the rotary drives 45, the longitudinal drives 50*a*, 50*b*, and the actuating drives 60*a*, 60*b*. The same process control also controls the hydraulics for longitudinally straining the threaded bolt 5 and the form-fitting tool for retightening the nut 6.

As described, the transfer of the screwing tools 10, 20 is effected in succession. On the other hand, the longitudinal straining of the threaded bolts 5 does not have to be effected in succession, but may be effected on both threaded bolts simultaneously.

In the case of the multi-screwing device being designed with a total of three screwing tools, two of these tools, for example, may longitudinally strain the respective threaded bolt 5, while at the same time the third screwing tool is repositioned, i.e. transferred to another screw-fastening.

For the purpose of reliably finding the respectively next screw-fastening position and to move the respective screwing tool 10, 20 to this next screw-fastening position, there are sensors 70 attached to the carrier 40. The sensors 70 are connected to the process control, i.e. the robot control, by means of signals. Suitable sensors are, in particular, image capturing cameras, laser sensors or inductive sensors. By means of the sensors 70, the respectively next screw-fastening position can preferably be detected in case the exact position of the individual screw-fastening positions, and in particular the position of the individual screw axes A, is not known and is not stored in advance as a fixed position data record.

The sensor systems of the sensors 70 may be designed to detect the respectively next threaded bolt 5 to be strained, or its screw axis A, or to detect the adjacent or two adjacent threaded bolts.

Figure 9:
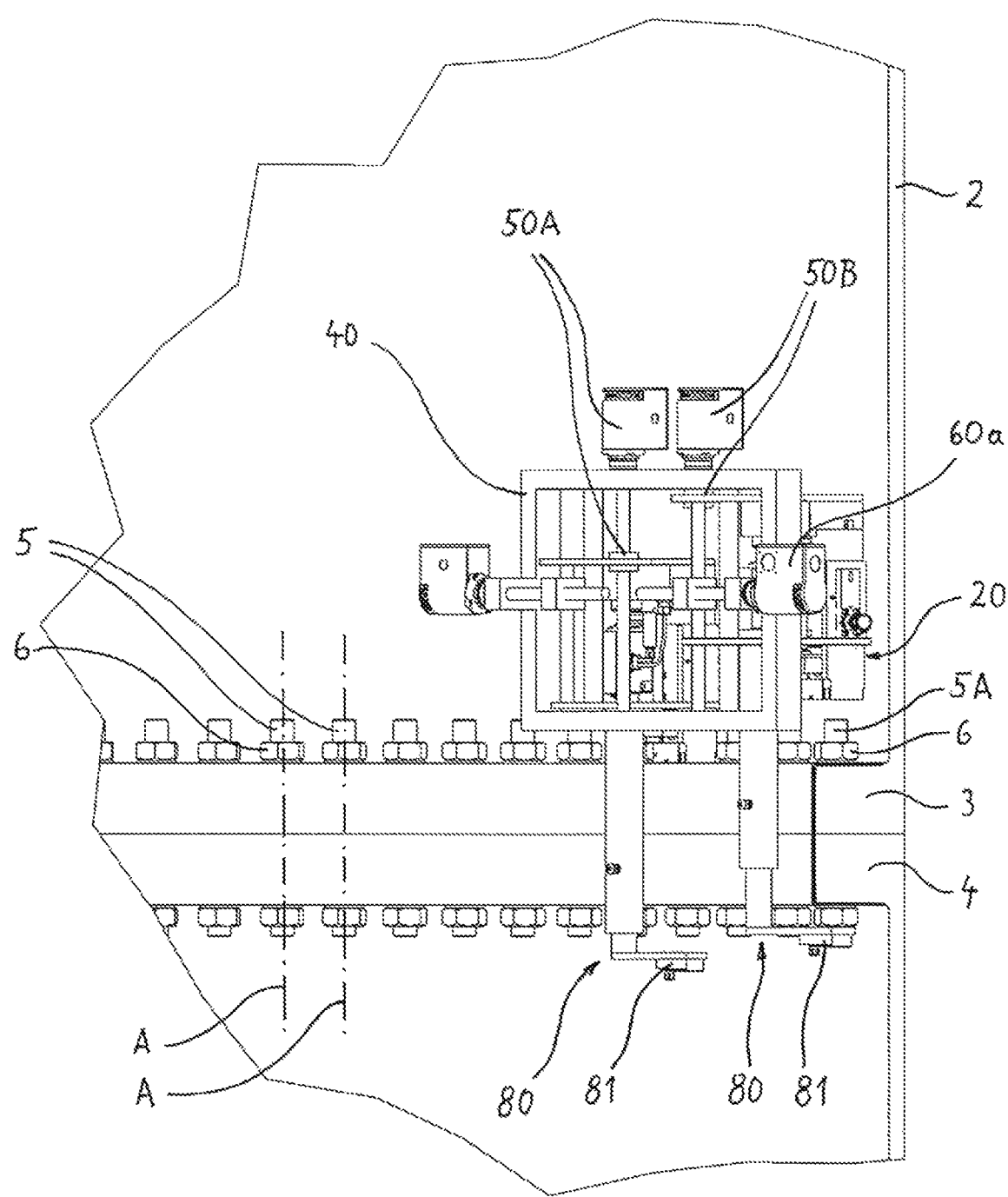
FIG. 9 a further embodiment of the tool module, here with additional anti-rotation device realized thereon.

FIG. 9 shows measures to prevent unintentional concomitant turning of the threaded bolt 5 as the exchangeable bushing 21 is being screwed on. A constituent part of the anti-rotation device is a holding tool 80 that can be moved back and forth between a neutral position and a counter-holding position, and that is preferably driven electrically, or alternatively by simple spring force. Each screwing tool 10, 20 is provided with its own associated holding tool 80.

For the duration of at least the screwing-on action of the exchangeable bushing 21, a counter-holding surface 81, with which the holding tool 80 is provided, is brought into a rotationally fixed bearing contact on the threaded bolt 5 or with the threaded bolt 5. This bearing contact may be form-fitting or frictional. It is understood that the location of the bearing contact cannot be the longitudinal portion L of the thread 5A that is screwed to the exchangeable bushing 21.

Figure 10C:
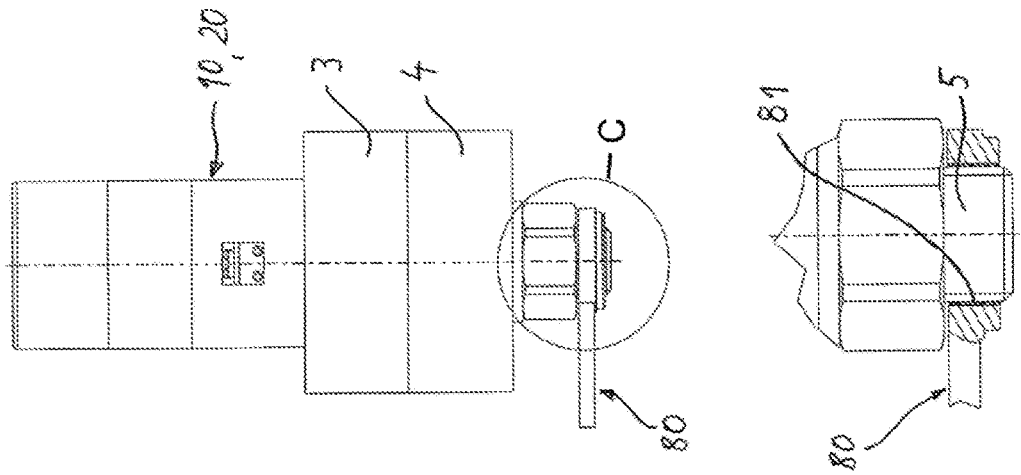
FIG. 10c a variant of an anti-rotation device that can be applied to a threaded bolt and prevent it from turning concomitantly, the detail "C" identified in the upper illustration being shown partially in section in the lower illustration of FIG. 10c.
Figure 10B:
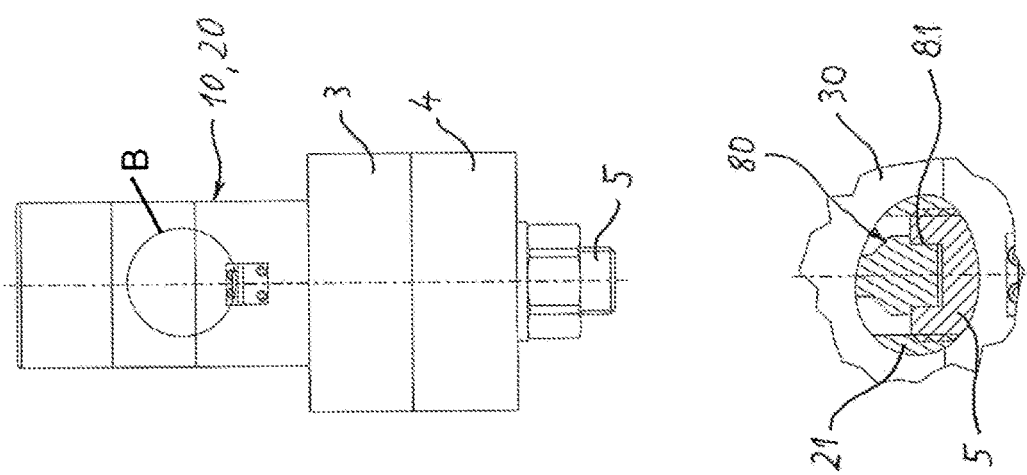
FIG. 10b a further variant of an anti-rotation device that can be applied to a threaded bolt and prevent it from turning concomitantly, the detail "B" identified in the upper illustration being shown partially in section in the lower illustration of FIG. 10b.
Figure 10A:
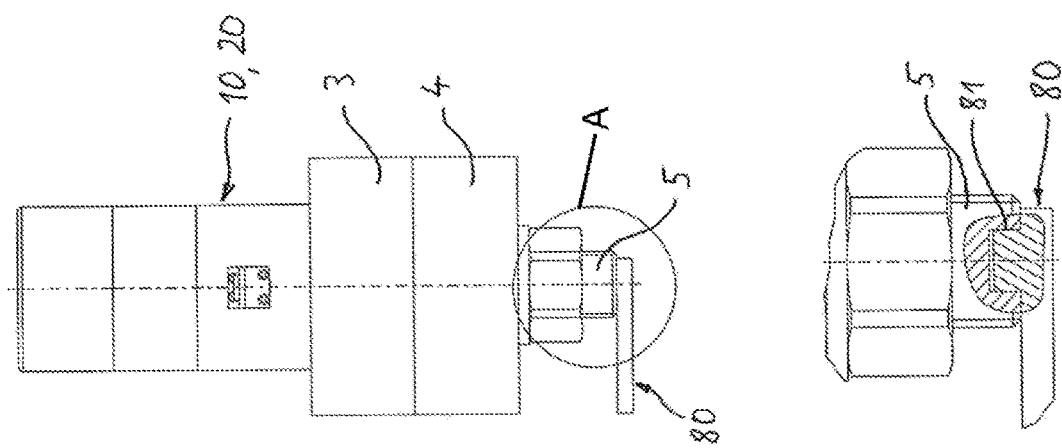

FIGS. 10*a*, 10*b*, and 10*c* show that there are different possibilities for the location on the threaded bolt 5 where the counter-holding surface 81 comes into bearing contact.

If, according to FIGS. 10*a* and 10*b*, the threaded bolt 5 is provided with an internal polygon or an external polygon at one of its two ends, the counter-holding surface 81 of the holding tool 80 is brought into bearing contact with this polygon by an axial movement, as a result of which a form fit, and thus the securing action against rotation, is achieved.

In the case of FIG. 10*b*, this anti-rotation device is realized in a space-saving manner within the exchangeable bushing 21 of the screwing tool 10, 20, and the holding tool 80 can automatically engage the screw-side polygon under the pressure of a spring mechanism, which is not illustrated.

Alternatively, as shown in FIG. 10*c*, the counter-holding surface 81 of the holding tool 80 may be brought into bearing contact directly with the thread of the threaded bolt 5, e.g. by a strong frictional connection to the thread. This radial contact with the thread may be effected either on the crests or on the flanks of the thread.

While the screwing tools 10, 20, including their devices for longitudinally straining the threaded bolt 5, for retightening the nut 6, as well as the rotary drives 45, the longitudinal drives 50*a*, 50*b*, and the actuating drives 60*a*, 60*b*, are grouped together in the tool module 1.1, the assemblies for the power supply are located in the supply module 1.2. This includes the hydraulic supply with the hydraulic pump and its control for the operation of the screwing tools 10, 20, and additionally the electric power supply and its control for the operation of the rotary drives 45, the longitudinal drives 50*a*, 50*b*, the actuating drives 60*a*, 60*b*, and the rotary sleeve 33 for tightening the respective nut 6.

Figure 2:
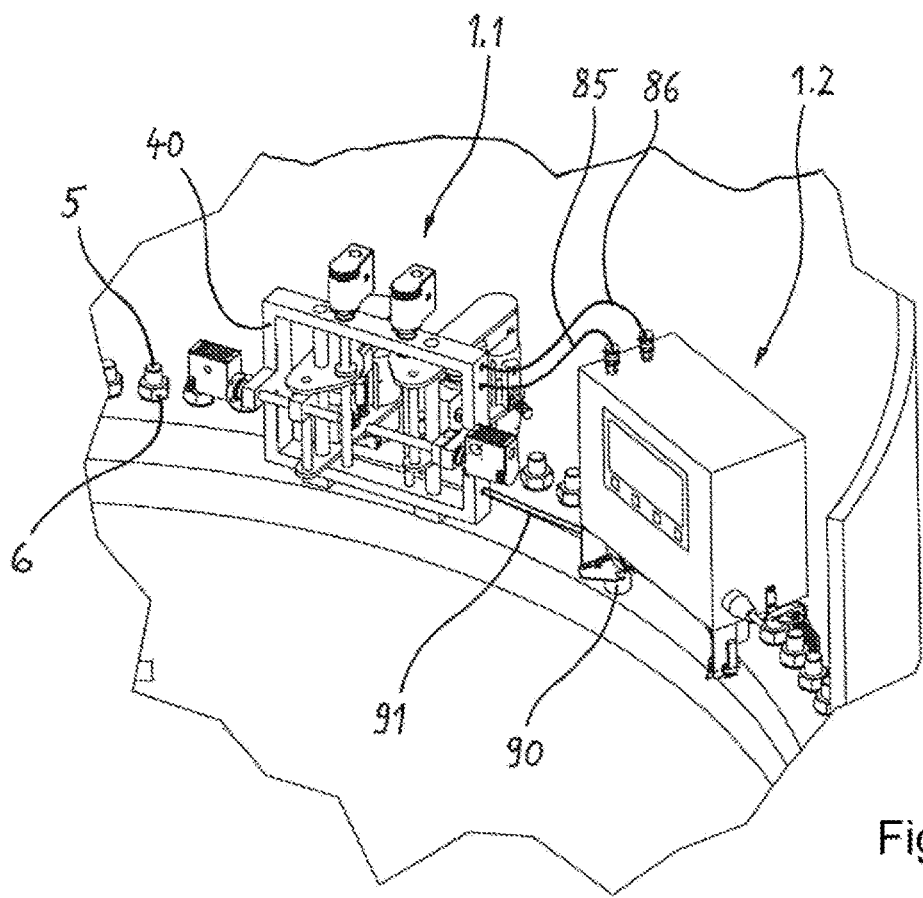
FIG. 2 the single unit "A" of FIG. 1 in an enlarged representation.
Figure 3:
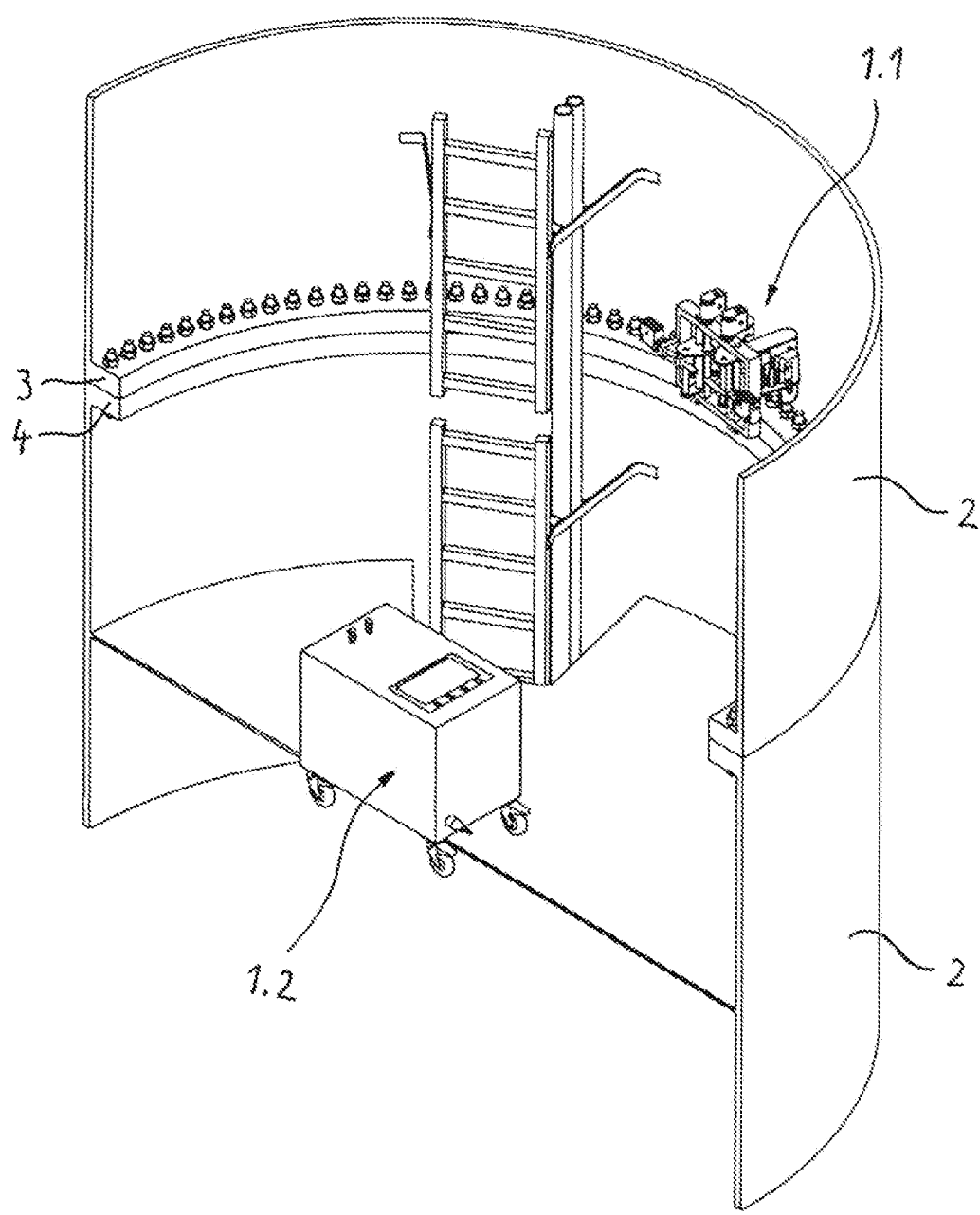
FIG. 3 the items of FIGS. 1 and 2 in a different embodiment.

According to FIGS. 1 to 3, a preferably flexible supply line 85 for hydraulic pressure leads from the supply module 1.2 to the hydraulic connections 37 of the two screwing tools. In addition, an electrical supply line 86 leads from the supply module 1.2 to the tool module 1.1.

The supply lines 85, 86 may form a common line strand. Moreover, there may be a wired or wireless signal connection between the modules 1.1, 1.2 for the control and monitoring signals of the robot control system.

In the case of the variant according to FIGS. 1 and 2, the supply module 1.2 is pulled, or alternatively pushed, by the tool module 1.1 in the manner of a trailer. For this purpose, the supply module 1.2 can be moved on the base U and parallel to the base U by rollers 90 or wheel elements that are rotatably mounted on the supply module 1.2. For the purpose of transmitting the tensile or pushing forces, the carrier 40 is mechanically connected to the supply module 1.1 via a flexible or articulated push or pull linkage 91.

In contrast, in the case of the variant according to FIG. 3, the supply module 1.2 is arranged in a stationary manner at a centrally located position, the tool module 1.1 moving around the supply module 1.2 from one screw-fastening to another. In the case of this design, the supply lines, which are not illustrated here and are preferably again of a flexible pliable design, lead likewise from the supply module 1.2 to the tool module 1.1.

LIST OF REFERENCE CHARACTERS 1 device, multi-screwing device
1.1 tool module
1.2 supply module
2 tower portion
3 flange
4 flange
5 threaded bolt
5A thread
6 nut
7 further nut
10 screwing tool, screw tensioning cylinder
20 screwing tool, screw tensioning cylinder
21 exchangeable bushing
23 tension thread
30 cylindrical housing
33 rotary sleeve
34 transmission
37 hydraulic connection
40 carrier
41 axle
42 axle
45 rotary drive
50*a* longitudinal drive
50*b* longitudinal drive
60*a* actuating drive
60*b* actuating drive
61 arm
62 arm
70 sensor
80 holding tool
81 counter-holding surface
85 supply line
86 supply line
90 rollers
91 push or pull linkages
A screw axis
A10 tool axis
A20 tool axis
L longitudinal portion
U base

What is claimed is:

1. A method for tightening screwed connections, each screwed connection comprised of a threaded bolt (5) and of a nut (6) screwed onto the thread (5A) of the threaded bolt (5) and supported against a base (U), wherein the screw axes (A) of the screwed connections are arranged in mutually fixed positions, by using a multi-screwing device (1) comprising screwing tools (10, 20), the screwing tools (10, 20) each comprising
an exchangeable bushing (21), which is arranged in the screwing tool (10, 20) so as to be rotatable about a tool axis (A10, A20), and on which a tension thread (23) is provided that can be screwed to a longitudinal portion (L) of the thread (5A),
a rotary drive (45) configured to screw the exchangeable bushing (21) onto and off the thread (5A),
a device for longitudinally straining the threaded bolt (5) by exerting a tensile force through the exchangeable bushing (21) along the tool axis (A10, A20),
a form-fitting tool configured to be coupled to the nut (6) for retightening the nut (6),
the screwing tools (10, 20) each being movable in the longitudinal direction of their tool axes (A10, A20) by a longitudinal drive (50*a*, 50*b*),
the screwing tools (10, 20) including a first screwing tool and a second screwing tool, and, by at least one actuating drive (60*a*, 60*b*), the first and second screwing tools (10, 20) being movable relative to each other in a direction that is at right angles relative to at least one of the tool axes (A10, A20),
at one point in time, the first and second screwing tools (10, 20) being simultaneously supported against the base (U), and the exchangeable bushing (21) of the first screwing tool (10) and the exchangeable bushing (21) of the second screwing tool (20) each being screwed onto the thread (5A) of a threaded bolt (5), and, with the position of the second screwing tool (20) being unchanged, the method comprising:
a) unscrewing the exchangeable bushing (21) of the first screwing tool (10) from the threaded bolt with the rotary drive (45), and raising the first screwing tool (10) with the longitudinal drive (50*a*);
b) moving the first screwing tool (10) relative to the second screwing tool (20) with the actuating drive (60*a*, 60*b*) into a new position in which the tool axis (A10) of the first screwing tool (10) is aligned with the screw axis (A) of a further threaded bolt (5);
c) in the new position, lowering the first screwing tool (10) with the longitudinal drive (50*a*) and screwing the exchangeable bushing (21) onto the further threaded bolt (5) with the rotary drive (45);

d) longitudinally straining the further threaded bolt (5) by exerting a tensile force with the exchangeable bushing (21) and retightening the nut (6) while maintaining the longitudinal straining action;

e) repeating steps a) to d) for the second screwing tool (20) while the position of the first screwing tool (10) is unchanged.

2. The method according to claim 1, further comprising providing a control system for moving the respective screwing tool (10, 20) into the new position, the control system being sensor-controlled by a sensor (70) designed to locate the position of the threaded bolt (5).

3. The method according to claim 1, further comprising actuating the actuating drive (60a, 60b) electrically, hydraulically or pneumatically.

4. The method according to claim 1, further comprising altering the distance between the tool axes (A10, A20) by the actuating drive (60a, 60b).

5. The method according to claim 4, wherein altering the distance of the tool axes (A10, A20) is effected by a linear movement.

6. The method according to claim 4, wherein altering the distance of the tool axes (A10, A20) is effected by an arcuate movement or a combination of two arcuate movements.

7. The method according to claim 6, further comprising arranging the screwing tools (10, 20) on a carrier and effecting the arcuate movements by swivelling the screwing tools (10, 20) relative to the carrier (40).

8. The method according to claim 1, further comprising actuating the longitudinal drives (50a, 50b) electrically, hydraulically or pneumatically.

9. The method according to claim 1, further comprising screwing on and off the exchangeable bushing (21) by the rotary drive (45) assigned exclusively to the respective screwing tool (10, 20).

10. The method according to claim 1, further comprising providing an anti-rotation device comprising a holding tool (80) that is designed to be movable back and forth between a neutral position and a counter-holding position, wherein for a duration of a screwing-on action of the exchangeable bushing (21), a counter-holding surface (81) of the holding tool (80) is brought into a rotation-locking bearing contact with the threaded bolt (5), wherein the location of the bearing contact is different from the longitudinal portion (L) of the thread (5A) that is screwed to the exchangeable bushing (21).

11. The method according to claim 10, further comprising providing a robot control system configured to move the respective screwing tool (10, 20) into the new position and to control the back-and-forth movement of the holding tool (80).

12. A multi-screwing device for screwed connections, each screwed connection comprised of a threaded bolt (5) and of a nut (6) screwed onto the thread (5A) of the threaded bolt (5) and supported against a base (U), wherein the screw axes (A) of the screw connections are arranged in mutually fixed positions, the multi-screwing device comprising screwing tools (10, 20), each screwing tool (10, 20) comprising:

an exchangeable bushing (21), which is arranged in the screwing tool (10, 20) so as to be rotatable about a tool axis (A10, A20) and which is provided with a tension thread (23) configured to be screwed to a longitudinal portion (L) of the thread (5A), a rotary drive (45) configured to screw the exchangeable bushing (21) onto and off the thread (5A), a device configured to longitudinally strain the threaded bolt (5) by exerting a tensile force through the exchangeable bushing (21) along the tool axis (A10, A20), a form-fitting tool configured to be coupled to the nut (6) for retightening the nut (6), wherein the screwing tools (10, 20) are each configured to be movable in the longitudinal direction of their tool axes (A10, A20) by a longitudinal drive (50a, 50b), and wherein the screwing tools (10, 20) are movable relative to each other, in a direction at right angles relative to at least one of the tool axes (A10, A20), by an actuating drive (60a, 60b).

13. The multi-screwing device according to claim 12, wherein each screwing tool (10, 20) is assigned its own actuating drive (60a, 60b).

14. The multi-screwing device according to claim 12, wherein the actuating drive (60a, 60b) is electrically, hydraulically or pneumatically actuated.

15. The multi-screwing device according to claim 12, further comprising a carrier (40), wherein the screwing tools (10, 20) are arranged on the carrier (40), and wherein at least one of the screwing tools (10, 20) is movable relative to the carrier (40) by the actuating drive (60a, 60b).

16. The multi-screwing device according to claim 15, further comprising one or more arms (61, 62), each arm connected to the carrier (40) and configured to swivel about an axle (41, 42) arranged on the carrier (40), wherein at least one of the screwing tools (10, 20) is attached to an end of one of the arms (61, 62).

17. The multi-screwing device according to claim 16, wherein the screwing tools (10, 20) are each attached to an end of one of the arms (61, 62).

18. The multi-screwing device according to claim 17, wherein the longitudinal drives (50a, 50b) are configured, independently of each other, to move the arms (61, 62) parallel to the longitudinal direction of the axle (41, 42).

19. The multi-screwing device according to claim 12, further comprising a supply module (1.2) comprising a first power supply for operating the device configured to longitudinally strain the threaded bolt (5), wherein the screwing tools (10, 20), the longitudinal drives (50a, 50b), and the actuating drives (60a, 60b) together form a tool module (1.1), wherein the tool module (1.1) and the supply module are spatially separate from each other, and wherein the first power supply comprises a first supply line (85) leading from the supply module (1.2) to the tool module (1.1).

20. The multi-screwing device according to claim 19, wherein the supply module (1.2) further comprises a second power supply for the rotary drives (45), the longitudinal drives (50a, 50b) and the actuating drives (60a, 60b), and wherein the second power supply comprises a second supply line (86) leading from the supply module (1.2) to the tool module (1.1).

21. The multi-screwing device according to claim 19, wherein the supply module (1.2) is configured to be movable parallel to the base (U) and wherein the supply module (1.2) is mechanically connected to the tool module (1.1) via a flexible or articulated push or pull linkage (91).

22. The multi-screwing device according to claim 21, wherein the supply module (1.2) is supported on rollers or wheel elements (90) that are rotatably mounted on the supply module.

23. The multi-screwing device according to claim 12, further comprising an anti-rotation device comprised of a holding tool (80) provided with a counter-holding surface (81) that is configured to be placed against the threaded bolt (5) at a location other than the longitudinal portion (L) of the thread (5A) that is screwed to the exchangeable bushing (21), and further comprised of a drive configured to move the holding tool (80) back and forth between a neutral position and a counter-holding position, wherein in the counter-holding position the counter-holding surface (81) engages the threaded bolt (5) in a rotation-locking bearing contact.

24. The multi-screwing device according to claim 23, wherein each screwing tool (10, 20) is provided with its own holding tool (80) and its own drive configured to move the holding tool (80).

25. The multi-screwing device according to claim 24, wherein the drives configured to move the holding tools (80) are coupled to a movement of the screwing tools (10, 20) along their tool axes (A10, A20).

* * * * *